US011823588B2

(12) United States Patent
Grossman et al.

(10) Patent No.: US 11,823,588 B2
(45) Date of Patent: Nov. 21, 2023

(54) REAL-TIME ORCHESTRATION FOR SOFTWARE LEARNING WORKSHOPS

(71) Applicant: AUTODESK, INC., San Francisco, CA (US)

(72) Inventors: Tovi Grossman, Toronto (CA); Benjamin Lafreniere, Toronto (CA); George Fitzmaurice, Toronto (CA); Volodymyr Dziubak, Winnipeg (CA); Andrea Bunt, Winnipeg (CA)

(73) Assignee: AUTODESK, INC., San Francisco, CA (US)

( * ) Notice: Subject to any disclaimer, the term of this patent is extended or adjusted under 35 U.S.C. 154(b) by 358 days.

(21) Appl. No.: 16/240,606

(22) Filed: Jan. 4, 2019

(65) Prior Publication Data
US 2019/0213912 A1 Jul. 11, 2019

Related U.S. Application Data

(60) Provisional application No. 62/614,319, filed on Jan. 5, 2018.

(51) Int. Cl.
G09B 19/00 (2006.01)
G09B 5/08 (2006.01)

(52) U.S. Cl.
CPC ........... G09B 19/0053 (2013.01); G09B 5/08 (2013.01)

(58) Field of Classification Search
CPC .......... G09B 7/07; G09B 7/073; G09B 7/077; G09B 19/0053; G06F 9/453
See application file for complete search history.

(56) References Cited

U.S. PATENT DOCUMENTS 4,637,797 A * 1/1987 Whitney ............ G09B 19/0053
434/335
5,577,186 A * 11/1996 Mann, II ............ G09B 19/0053
715/201
5,602,982 A * 2/1997 Judd ...................... G06F 9/453
706/927

(Continued)

OTHER PUBLICATIONS

Akers et al., "Undo and Erase Events as Indicators of Usability Problems", Proceedings of the International Conference on Human Factors in Computing Systems, CHI 2009, Apr. 7, 2009, pp. 659-668.

(Continued)

*Primary Examiner* — Peter R Egloff
(74) *Attorney, Agent, or Firm* — Artegis Law Group, LLP

(57) ABSTRACT

One embodiment of the present application sets forth a computer-implemented method for remotely monitoring performance of a task in real time, comprising receiving, in real time from a first student computing device, first student data that includes a first set of actions performed in a first student application instance executing on the first student device, comparing a first student action included in the first set of actions to a first target action, in response to comparing the first student action to the first target action, identifying a first issue indicator associated with the first student action, determining a first remedy associated with at least one of the first target action and the first issue indicator, and performing a first remediation action associated with the first remedy.

20 Claims, 7 Drawing Sheets

(56) References Cited

U.S. PATENT DOCUMENTS

| | | | | |
|---|---|---|---|---|
| 5,823,781 | A * | 10/1998 | Hitchcock | G09B 19/0053 434/323 |
| 6,594,466 | B1 * | 7/2003 | Harned | G09B 19/0053 434/307 R |
| 6,790,045 | B1 * | 9/2004 | Drimmer | G09B 7/00 434/362 |
| 7,466,958 | B2 * | 12/2008 | Dunk | G09B 7/02 434/118 |
| 8,457,544 | B2 * | 6/2013 | German | G06F 16/24578 434/350 |
| 2004/0081952 | A1 * | 4/2004 | Burns | G09B 19/0053 434/350 |
| 2004/0241624 | A1 * | 12/2004 | Sudo | G09B 19/0053 434/118 |
| 2006/0047544 | A1 * | 3/2006 | Habon | G06F 9/453 715/765 |
| 2010/0077327 | A1 * | 3/2010 | Pulsipher | G06Q 10/10 715/764 |
| 2012/0072416 | A1 * | 3/2012 | Gowel | G06F 9/453 707/723 |
| 2015/0104762 | A1 * | 4/2015 | Luke | G09B 19/04 434/169 |
| 2015/0221235 | A1 * | 8/2015 | Regan | G06F 8/38 434/118 |
| 2016/0093232 | A1 * | 3/2016 | Chong | G06F 8/436 434/118 |
| 2017/0214768 | A1 * | 7/2017 | Barber | H04L 67/42 |
| 2017/0372630 | A1 * | 12/2017 | Janes | G06F 40/205 |
| 2018/0225130 | A1 * | 8/2018 | Padmanabhan | G06F 3/0481 |
| 2018/0247562 | A1 * | 8/2018 | Downs | G09B 5/00 |

OTHER PUBLICATIONS

Anderson et al., "Cognitive Tutors: Lessons Learned", Journal of the Learning Sciences, vol. 4 No. 2, 1995, pp. 167-207.

Arnold et al., "Course Signals at Purdue: Using Learning Analytics to Increase Student Success", Proceedings of the International Conference on Learning Analytics and Knowledge, 2012, pp. 267-270.

Baker et al., "Towards Automatically Detecting Whether Student Learning is Shallow", Intelligent Tutoring Systems, Springer Berlin/Heidenberg, 2012, pp. 444-453.

Baker, Ryan S., "Stupid Tutoring Systems, Intelligent Humans", International Journal of Artificial Intelligence in Education 26 (2), 201, pp. 600-614.

Baker et al., "Better to be Frustrated than Bored: the Incidence, Persistence, and Impact of Learners' Cognitive-Affective States During Interactions with Three Different Computer-based Learning Environments", International Journal of human-computer studies 68 (4), 2010, pp. 223-241.

Baker et al., "The State of Educational Data Mining in 2009 : A Review and Future Visions", Journal of Educational Data Mining, Article 1, vol. 1, No. 1, Fall 2009, 14 pages.

Beck et al., How Who Should Practice: Using Learning Decomposition to Evaluate the Efficacy of Different Types of Practice for Different Types of Students. Intelligent Tutoring Systems, 2008, pp. 353-362.

Billingsley et al., "Indirect Interaction : A Computing Lecture for Five to Seven Year-Olds", Proceedings of the Conference Companion Publication on Designing Interactive Systems, DIS '16 Companion, Jun. 4-8, 2016, pp. 145-148.

Broderick et al., "Increasing Parent Engagement in Student Learning Using an Intelligent Tutoring System", Journal of Interactive Learning Research vol. 22 No. 4, May 2010, pp. 523-550.

Chen et al., "History Assisted View Authoring for 3D Models", Proceedings of the ACM Conference on Human Factors in Computing Systems, CHI 2014, pp. 2027-2036.

Chu et al., "Making the Maker: A Means-to-an-Ends Approach to Nurturing the Maker Mindset in Elementary-Aged Children", International Journal of Child-Computer Interaction 5, 2015, 20 pages.

Conati et al., "Using Bayesian Networks to Manage Uncertainty in Student Modeling", User Modelling and User-Adapted Interaction, vol. 12 No. 4, 2002, pp. 371-417.

Fitton et al., "Exploring Children's Designs for Maker Technologies", Proceedings of the International Conference on Interaction Design and Children, 2015, pp. 379-382.

Fourney et al., "InterTwine: Creating Interapplication Information Scent to Support Coordinated Use of Software", Proceedings of the ACM Symposium on User Interface Software and Technology, Oct. 5-8, 2014, pp. 429-438.

Diaz et al., "Profiling styles of use in Alice: Identifying patterns of use by observing participants in workshops with Alice", Blocks and Beyond Workshop, 2015 IEEE, pp. 19-24.

Grossman et al., "Chronicle: Capture, Exploration, and Playback of Document Workflow Histories", Proceedings of annual ACM Symposium on User Interface Software and Technology, 2010, pp. 143-152.

Guerra et al., "An Intelligent Interface for Learning Content: Combining an Open Learner Model and Social Comparison to Support Self-Regulated Learning and Engagement", Proceedings of the International Conference on Intelligent User Interfaces, Mar. 7-10, 2016, pp. 152-163.

Guo, Philip J., "Codeopticon: Real-Time, One-To-Many Human Tutoring for Computer Programming", Proceedings of the ACM Symposium on User Interface Software & Technology, 2015, pp. 599-608.

Gutwin et al., Peripheral Popout: Proceedings of the International Conference on Human Factors in Computing Systems, May 6-11, 2017, pp. 208-219.

Hudson et al., Understanding Newcomers to 3D Printing: Motivations, Workflows, and Barriers of Casual Makers. Proceedings of the International Conference on Human Factors in Computing Systems, 2016, pp. 384-396.

Kay, Judy, "Learner Know Thyself: Student Models to Give Learner Control and Responsibility", International Conference on Computers in Education, 1997, pp. 17-24.

Lafreniere et al., "Community Enhanced Tutorials: Improving Tutorials with Multiple Demonstrations", Proceedings of International Conference on Human Factors in Computing Systems, 2013, 1779-1788.

Lau et al., "Programming by Demonstration: An Inductive Learning Formulation", Proceedings of the International Conference on Intelligent User Interfaces, 1998, pp. 145-152.

Li et al., "CADament: a Gamified Multiplayer Software Tutorial System", Proceedings of the International Conference on Human Factors in Computing Systems, 2014, pp. 3369-3378.

Looi et al., "Collaborative Activities Enabled by GroupScribbles: An Exploratory Study of Learning Effectiveness", Computers and Education vol. 54, No. 1, 2010, pp. 14-26.

Mateo et al., "Creating Active Learning in a Large Introductory Statistics Class Using Clicker Technology", Data and context in statistics education: Towards an evidence-based society. Proceedings of the International Conference on Teaching Statistics, Jul. 2010, 5 pages.

Raghuveer et al., "Reinforcement learning approach towards effective content retrieval in an e-Learning environment," 2014 IEEE International Conference on MOOC, Innovation and Technology in Education (MITE), Dec. 2014, pp. 285-289.

Bull et al., "Open learner models. Advances in intelligent tutoring systems", in Advances in Intelligent Tutoring Systems, R. Nkambou et al. (Eds.), 2010, pp. 301-322.

Park et al., "Children as Webmakers : Designing a Web Editor for Beginners", Interaction Design and Children, 2013, pp. 419-422.

Pongnumkul et al., "Pause-and-Play: Automatically Linking Screencast Video Tutorials with Applications", Proceedings of the ACM Symposium on User Interface Software and Technology, Oct. 16-19, 2011, pp. 135-144.

Richard et al., "Making Physical and Digital Games with E-Textiles: A Workshop for Youth Making Responsive Wearable Games and Controllers," Proceedings of the International Conference on Interaction Design and Children, 2015, pp. 399-402.

(56) References Cited

OTHER PUBLICATIONS

Stickel et al., "3D Printing with marginalized children—an exploration in a Palestinian refugee camp", Proceedings of the European Conference on Computer Supported Cooperative Work, 2015, pp. 83-101.
Topping, Keith J., The Effectiveness of Peer Tutoring in Further and Higher Education: A Typology and Review of the Literature, Higher Education, vol. 32, No. 3, 1996, 321-345.
Zapata et al., Keeping Your Audience in Mind: Applying Audience Analysis to the Design of Interactive Score Reports. Assessment in Education: Principles, Policy & Practice, http://dx.doi.org/10.1080/0969594X.2014.936357, vol. 21, No. 4, 2014, pp. 442-463.

\* cited by examiner

REAL-TIME ORCHESTRATION FOR SOFTWARE LEARNING WORKSHOPS

CROSS-REFERENCE TO RELATED APPLICATIONS

This application claims the priority benefit of the U.S. Provisional Patent Application having Ser. No. 62/614,319 and filed on Jan. 5, 2018. The subject matter of this related application is hereby incorporated herein by reference.

BACKGROUND OF THE INVENTION

Field of the Invention

Embodiments of the present invention relate generally to computer science and, more specifically, to real-time orchestration for software learning workshops.

Description of the Related Art

A common way to introduce users to a software program is through a software learning workshop. During a software learning workshop, a leader provides instructions to a group of students, where the instructions relate to the functionality and features of a particular software program. Oftentimes, a leader will introduce software features by demonstrating how a particular task can be performed through use one or more functions included in the particular software program. The leader may then guide the group of students as the students attempt to perform the demonstrated task using the same software program.

When facilitating an in-person software workshop, a leader can guide a group of students, where students in the group operate one or more computers that are separate from the leader. For example, the leader can guide the students through a follow-along tutorial, where the leader instructs the students to perform a specific list of actions related to the actions initially performed by the leader using the leader's computer. After demonstrating the proper technique to perform the task using the software program, the leader can subsequently supervise the progress of the students by manually confirming that each the students successfully performed the list of actions. For example, the leader may demonstrate a particular task by initially using her computer to perform a series of actions using the tools and functions included in the particular software. The leader may then task the group of students to perform the same task, and the leader may manually supervise the progress of the students as the students attempt to perform the task.

At least one drawback of conventional software-learning workshops is that such workshops require workshop leaders to physically move from one student computer to another to determine and verify the progress of the students of the workshop. In particular, the leader may perform an action on her computer, but then is unable to assess from her own computer whether students of the workshop have successfully completed the same task. This manual progress monitoring is laborious for workshop leaders and does not allow the workshop leaders to effectively assist the workshop students.

As the foregoing illustrates, what is needed in the art are more effective techniques for monitoring the progress of students when performing tasks and notifying the leader of the relative progress of the group of students.

SUMMARY OF THE INVENTION

One embodiment of the present application sets forth a computer-implemented method for remotely monitoring performance of a task in real time, comprising receiving, in real time from a first student computing device, first student data that includes a first set of actions performed in a first student application instance executing on the first student device, comparing a first student action included in the first set of actions to a first target action, in response to comparing the first student action to the first target action, identifying a first issue indicator associated with the first student action, determining a first remedy associated with at least one of the first target action and the first issue indicator, and performing a first remediation action associated with the first remedy.

At least one technological advantage of the described techniques is that the orchestration system automatically identifies an issue experienced by a student when attempting to perform a specified task, and responds by performing one or more remediation actions associated with a remedy for the issue. The orchestration system thus automatically identifies issues and associated remedies, effectively assisting students when perform a specific task. The orchestration system thus increases the usability of tools and functions included in a software product, and enables a leader to more effectively manage a group of users through performing a specific task.

DETAILED DESCRIPTION

In the following description, numerous specific details are set forth to provide a more thorough understanding of the present invention. However, it will be apparent to one of skilled in the art that the present invention may be practiced without one or more of these specific details.

Figure 1:
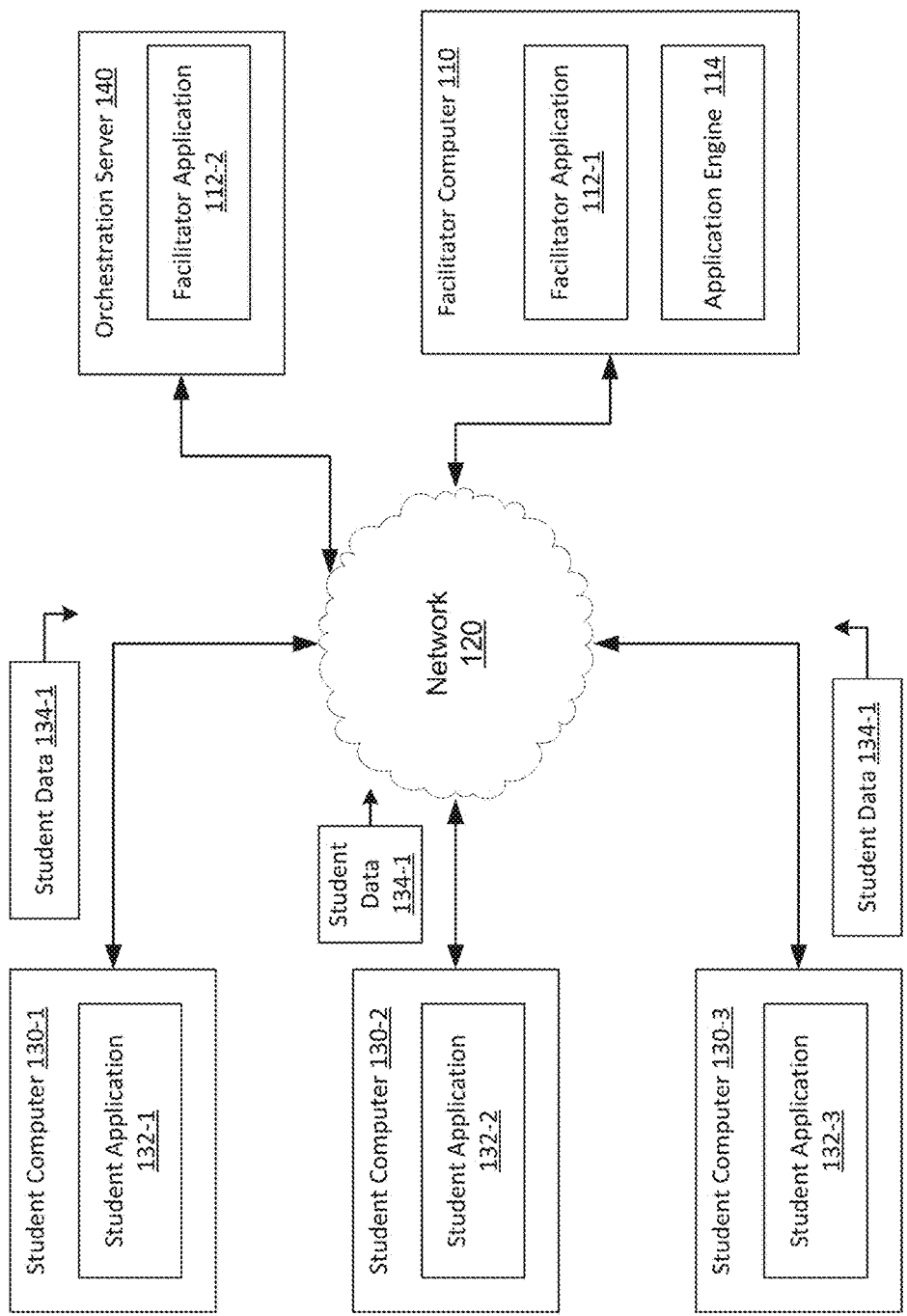
FIG. 1 is a conceptual illustration of an orchestration system configured to implement one or more aspects of the present invention.

FIG. 1 is a conceptual illustration of an orchestration system 100 configured to implement one or more aspects of the present invention. As shown, orchestration system 100 includes, without limitation, facilitator computer 110, network 120, student computers 130 (e.g., 130-1 to 130-3), and orchestration server 140. In alternative embodiments, orchestration system 100 may include any number of facilitator computers 120, student computers 130, and/or orchestration servers 140, in any combination. In operation, a student computer 130 creates student data 134 when a student performs actions within student application 132. Student data 134 is sent via network to a facilitator application 112 (e.g., 112-1 and 112-1) executing on at least one of orchestration server 140 and/or facilitator computer 110. Student computer 130 may subsequently receive one or more commands from facilitator computer 110 via network 120. The one or more commands are associated with performing one or more remediation actions in student application instances 132-1 to 132-3 and/or application engine 114, as determined by the facilitator application 112.

Orchestration server 140 comprises a computer system configured to receive student data 134 from one or more student computers 130. In various embodiments, orchestration server 140 execute an instance of facilitator application 112-2 in order to analyze the received student data 134 and determine whether one or more devices in orchestration system 100 need to execute a remediation action associated with one or more actions included in student data 134. In some embodiments, facilitator computer 110 may comprise a computer system that executes an instance of facilitator application 112-1. In such instances, facilitator computer 110 may be configured to receive student data 134.

In various embodiments, facilitator application 112 can group portions of various student data 134 into a dataset and store the dataset as session data. For example, facilitator application 112 can aggregate all student data 134-1 received from student computer 130-1 during a single session and store the aggregation of student data 134-1 as a portion of session data. Additionally or alternatively, facilitator application 112 aggregates student data 134-1 to 134-3 as an aggregated group dataset. In such instances, facilitator application 112 can extract a subset of data from the aggregated group dataset. Student data 134 may be formatted and stored on a storage system at orchestration server 140, facilitator computer 110, and/or another device, such as a separate data storage device connected via network 120, using any technically-feasible technique. A data transfer protocol, such as hypertext transfer protocol (HTTP) or file transfer protocol (FTP), may be used to transfer student data 134 between student computer 130 and the device storing the student data 134.

In various embodiments, facilitator application 112 can use information in student data 134 to enable display of one or more student contexts related to student application instances 132-1 to 132-3. As will be discussed in further detail below, in various embodiments, facilitator application 112 can separately analyze data included in student data 134-1 in order to provide a student context associated with a student application instance 132-1. Facilitator application 112 can analyze the student data 134-1 associated with a given student context and, upon determining an issue identifier associated with a student action, perform one or more remediation actions associated with the issue student action.

Facilitator computer 110, student computers 130, and/or orchestration server 140 communicate via network 120 in order for orchestration system 100 process student data 134 and perform one or more remediation actions associated with student data 134. Network 120 includes a plurality of network communications systems, such as routers and switches, configured to facilitate data communication between student computers 130 and facilitator computer 110. Persons skilled in the art will recognize that many technically-feasible techniques exist for building network 120, including technologies practiced in deploying the well-known internet communications network. For example, network 120 may include a wide-area network (WAN), a local-area network (LAN), and/or a wireless (Wi-Fi) network, among others.

One or more of facilitator computer 110, orchestration server 140, and/or student computers 130 can be a desktop computer, laptop computer, mobile computer, or any other type computing system configured to receive input, process data, display images, and is suitable for practicing one or more embodiments of the present invention. As will be discussed in greater detail below, student computer 120 is configured to enable a student user to perform one or more actions within student application 132. Orchestration server 140 and/or facilitator computer 110 are configured to enable facilitator application 112 to analyze student data 134 and determine a remediation associated with one or more student actions included in student data 134. Facilitator computer is configured to enable a facilitator to perform one or more actions within application engine 114.

Student application 132 (e.g., 132-1 to 132-3) is an instance of an application executing on a student computer 130 (e.g., 130-1 to 130-3). Student application 132 includes various tools and functions that enable a user to perform specific tasks within student application 132. For example, student application 132-1 can be an instance of a three-dimensional design application that is implemented by student computer 130-1. In various embodiments, student application 132 can be one of several types of software products, such as coding environments, graphics design applications, word processing applications, entertainment applications (e.g., content playback applications, games, etc.), and so forth.

Student data 134 (e.g., 134-1 to 134-3) includes a set of data associated with one or more actions performed by a student user. Student computer 130 records the actions included in student data 134 when the user performs operations while working within student application 132. During operation, student computer 130 logs one or more actions performed within student application 132 and stores the logged actions as student data 134. In some embodiments, student computer 130 can store additional information associated with the student action. The additional information could be other recorded information, such as a time-stamp, a screenshot, audio recording, etc. In various embodiments, student computer 130 may transmit student data 134 in real time to facilitator application 112. In such instances, student computer 130 may transmit separate packets of student data 134, where each packet of student data 134 includes a discrete set of logged student actions. For example, student computer 130-2 could periodically send a packet of student data 134-2 that includes the set of actions taken by the student user in the student application instance 132-2 since the last packet of student data 134-2 was sent.

Application engine 114 is an instance of an application executing on facilitator computer 110. In some embodiments, application engine 114 can be an instance of the same software program as student application 132. For example, application engine 114 and student application 132-2 can both be instances of the same three-dimensional design software program. In some embodiments, application engine 114 may include additional features and/or functionalities that are not included in student application instances 132-1 to 132-3. For example, application engine 114 can include additional templates, tools, macros, and so forth. Application engine 114 can log one or more actions performed by the facilitator as facilitator actions. In some embodiments, application engine 114 can send the stored facilitator actions to facilitator application 112 in order for facilitator application 112 to store the facilitator actions as one or more target actions.

Facilitator application 112 (e.g., 112-1 to 112-2) is an instance of an application executing on orchestration server 140 and/or facilitator computer 110. Facilitator application 112 receives student data 134 and analyzes the student data 134 in order to determine whether one or more remediation actions need to be performed relating to one or more student actions included in student data 134. For example, facilitator application 112 could analyze logged actions included in received student data 134 against one or more target actions in order to determine that one or more tasks were not performed correctly. In such instances, facilitator application 112 could provide an indication in the graphical user interface displayed by facilitator computer 110.

Alternatively or additionally, facilitator application 112 could cause one or more student computers 130-1 to 130-3 to perform remediation actions. For example, facilitator application 112 could cause student computer 130-1 to perform a first remediation action by providing a visual notification (e.g., an alert and/or a reminder) to perform a target action. In addition, facilitator application 112 could cause student computer 130-2 to perform one or more remediation actions, such as causing student computer 130-2 to display a notification indicating that a student user associated with student computer 130-2 should help a specific student (e.g., a student user associated with student computer 130-1).

Figure 2:
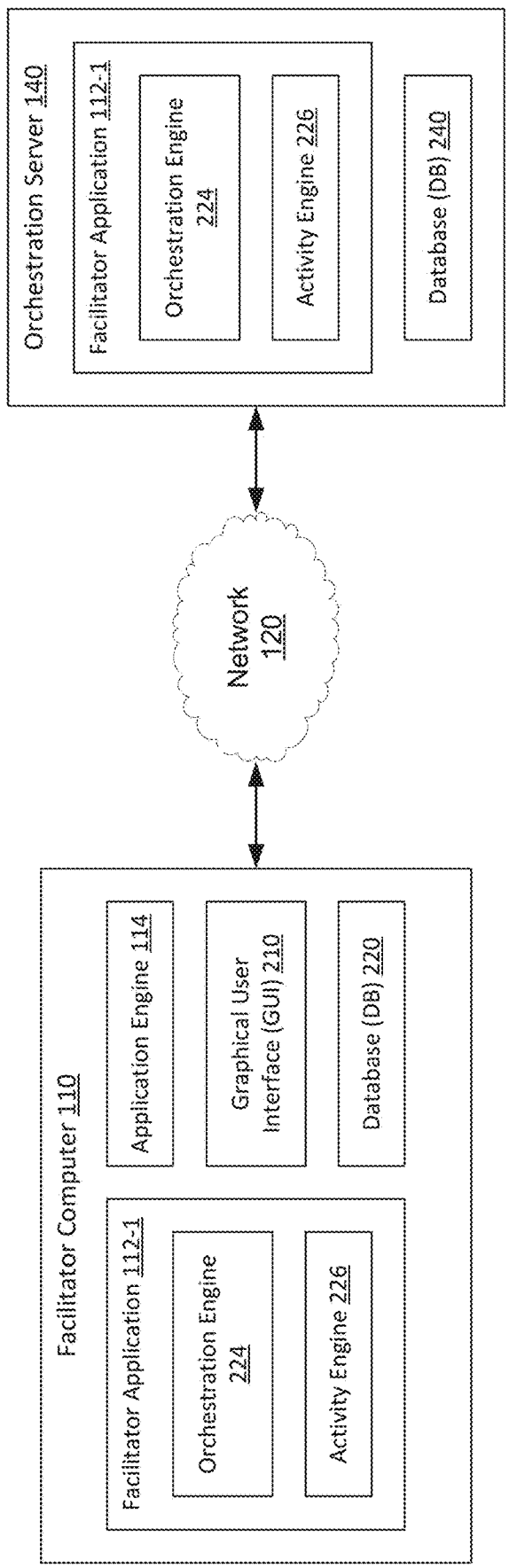
FIG. 2 is a more detailed illustration of components of the orchestration system of FIG. 1, according to various embodiments of the present invention.

FIG. 2 is a more detailed illustration of components of the orchestration system 100 of FIG. 1, according to various embodiments of the present invention. As shown, orchestration system 200 includes facilitator computer 110, network 120, and orchestration server 140. Facilitator computer includes facilitator application instance 112-1, application engine 114, graphical user interface (GUI) 210, and database (DB) 220. Orchestration server 140 includes facilitator application instance 112-2, and database 240. Each facilitator application includes an orchestration engine 224 and an activity engine 226. In operation, facilitator application 112 executing on facilitator computer 110 and/or orchestration server 140 receives student data 134 from the one or more student computers 130, analyzes the student data 134, and determines one or more remediation actions for orchestration system 200 to perform based on the student data 134.

Facilitator application 112 and/or application engine 114 executes on a central processing unit (CPU) and/or a graphical processing unit (GPU). Applications 112 and 114 configure a display device connected to facilitator computer 110 and/or orchestration server 140 to display GUI 210. In general, GUI 210 provides a variety of visual components (e.g., graphical windows, interfaces, tools, contexts, etc.) associated with facilitator application 112 and/or application engine 114.

Databases 220, 240 can store values and other data used by facilitator computer 110 and/or orchestration server 140 in order to coordinate the operation of facilitator application 112. During operation, facilitator computer 110 and/or orchestration server 140 store values in database 220, 240 and/or retrieve values stored in database 220, 240. For example, database 240 included in orchestration server 140 could store student data 134, mappings of student actions to issue indicators, pre-defined remedies, predefined remediation actions, and so forth.

In various embodiments, database 240 can include one or more lookup tables (LUTs), where the one or more lookup tables store entries that include mappings between values. For example, database 240 could include a remedy LUT that includes entries of mappings of issue identifiers for specific issues (e.g., functional issues, navigational issues, inaction issues, etc.), to specific remedies (e.g., video demonstrations, graphical alerts, notification sounds, etc.).

Facilitator application 112 includes orchestration engine 224 and/or activity engine 226. In operation, facilitator application 112 executes one or more of orchestration engine 224 and/or activity engine 226 in order to analyze real-time student data 134 received from one or more student applications 132. In some embodiments, facilitator application 112 can execute activity engine 226 in order to determine one or more specific remedies to associate with a given set of student actions and/or issue indicators. In such instances, the one or more specific remedies can be stored for later use by orchestration engine 224. For example, facilitator application 112 could execute activity engine 226 to compile student data 134 from one or more previous sessions of activity. Activity engine 226 could analyze the compiled student data 134 and extract a subset of data from the compiled student data 134 that corresponds with a specific target action that each of the students is supposed to successfully perform. Activity engine 226 can generate an activity pattern associated with the specific target action. In various embodiments, activity engine 226 can compare a given activity pattern is associated target action in order to generate parameters associated with the target action. For example, activity engine 226 can determine whether a set of student actions performed within a specific time period match the specific target action. In some embodiments, activity engine 226 can determine one or more remedies to associate with the target action based on the activity pattern. In such instances, activity engine 226 can generate an entry mapping the determined remedy with the target action, and can then store the generated entry in database 220, 240.

Additionally or alternatively, facilitator application 112 can execute orchestration engine 224 in order to monitor student activities in real time by analyzing received student data 134. In such instances, facilitator application 112 executes orchestration engine 224 to perform one or more remediation actions upon determining that the student data indicates that one or more students need assistance. For example, facilitator application 112 receives student data 134 from one or more student computers 130, where student data 134 is a dataset include a multiple actions performs in student applications 132-1 to 132-3. These actions correspond to the actions of one or more students attempting to perform a specific target action (e.g., a facilitator action performed in application engine 114 and sent to facilitator application 112).

Orchestration engine 224 can extract one or more student actions from student data 134 and the student actions to the target action. In some embodiments, orchestration engine 224 can also receive one or more activity patterns from activity engine 226 and compare the student actions to the target action using additional information from the received activity pattern(s). In various embodiments, orchestration engine 224 can execute one or more heuristic techniques to analyze the student actions. For example, orchestration engine 224 can use activity patterns associated with a specific target action to determine a maximum time to wait until determining that a student has not performed any actions in order to match the specific target (e.g., student computer 132-3 is idle without performing any actions matching the specific target action). In such instances, orchestration engine can wait until reaching the maximum time before determining that the target action was not performed correctly.

Upon determining, based on real-time student data 134-3 associated with a specific student application instance 132-3, that the target action was not performed correctly, orchestration engine 224 identifies a remedy to assist in successfully performing the target action. In various embodiments, orchestration engine 224 identifies an issue identifier associated with the student action performed and retrieves a remedy associated with the issue identifier. For example, orchestration engine 224 can respond to determining that the student did not perform the target action correctly by analyzing student data 134 to determine specific student actions taken and assign an applicable issue identifier. Orchestration engine 224 can then identify a remedy that corresponds to the assigned issue identifier. For example, orchestration engine 224 could retrieve one or more entries in a remedy LUT stored in database 240 that match the assigned issue identifier to identify the one or more remedies corresponding to the issue identifier. Additionally or alternatively, orchestration engine 224 can retrieve a plurality of candidate remedies associated with the identified issue identifier. In such instances, facilitator application 112 can perform a remediation action associated with the candidate remedy selected by the facilitator and/or student user.

Figure 3A:
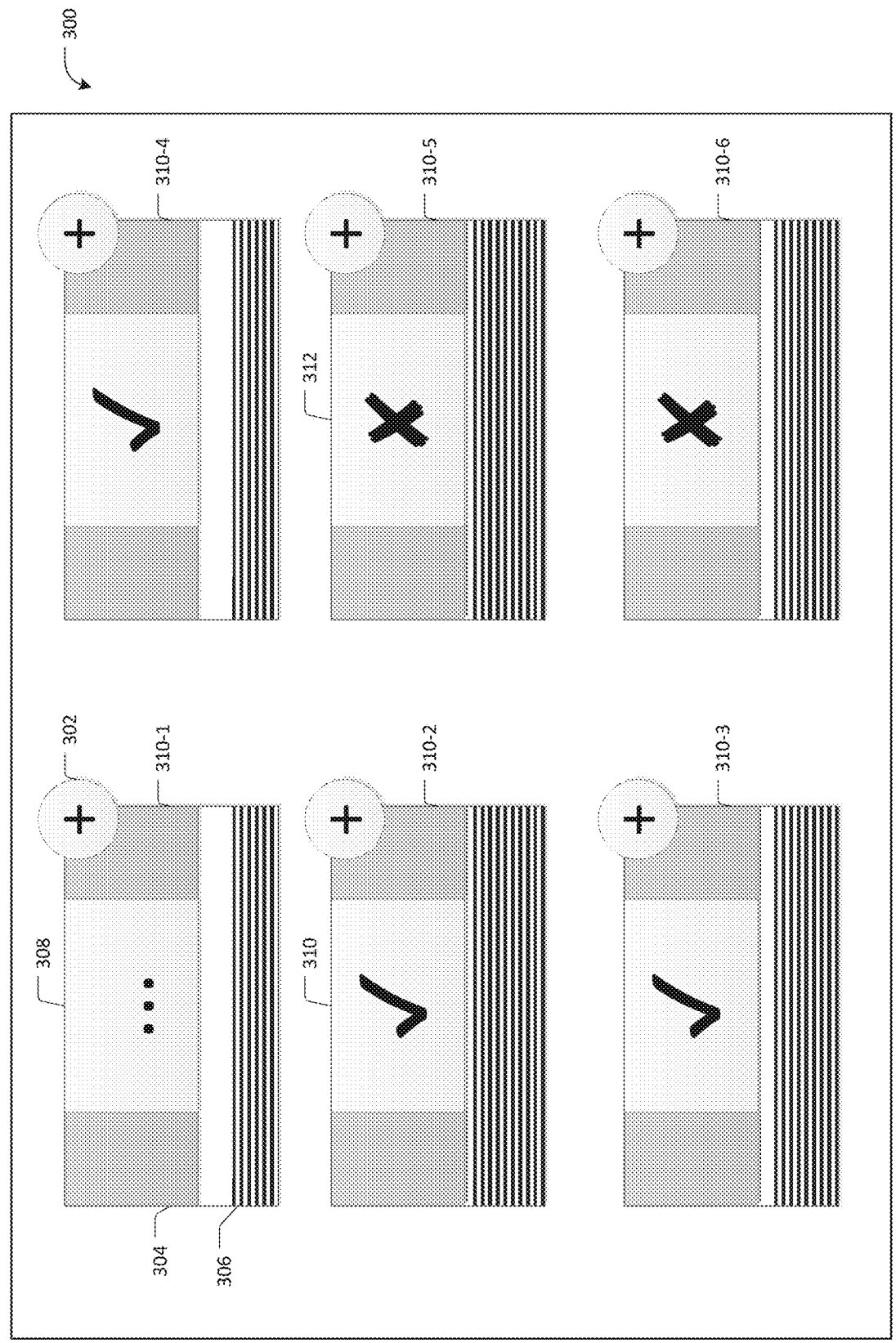
FIG. 3A illustrates an example graphical user interface for the facilitator application, according to various embodiments of the present invention.
Figure 3B:
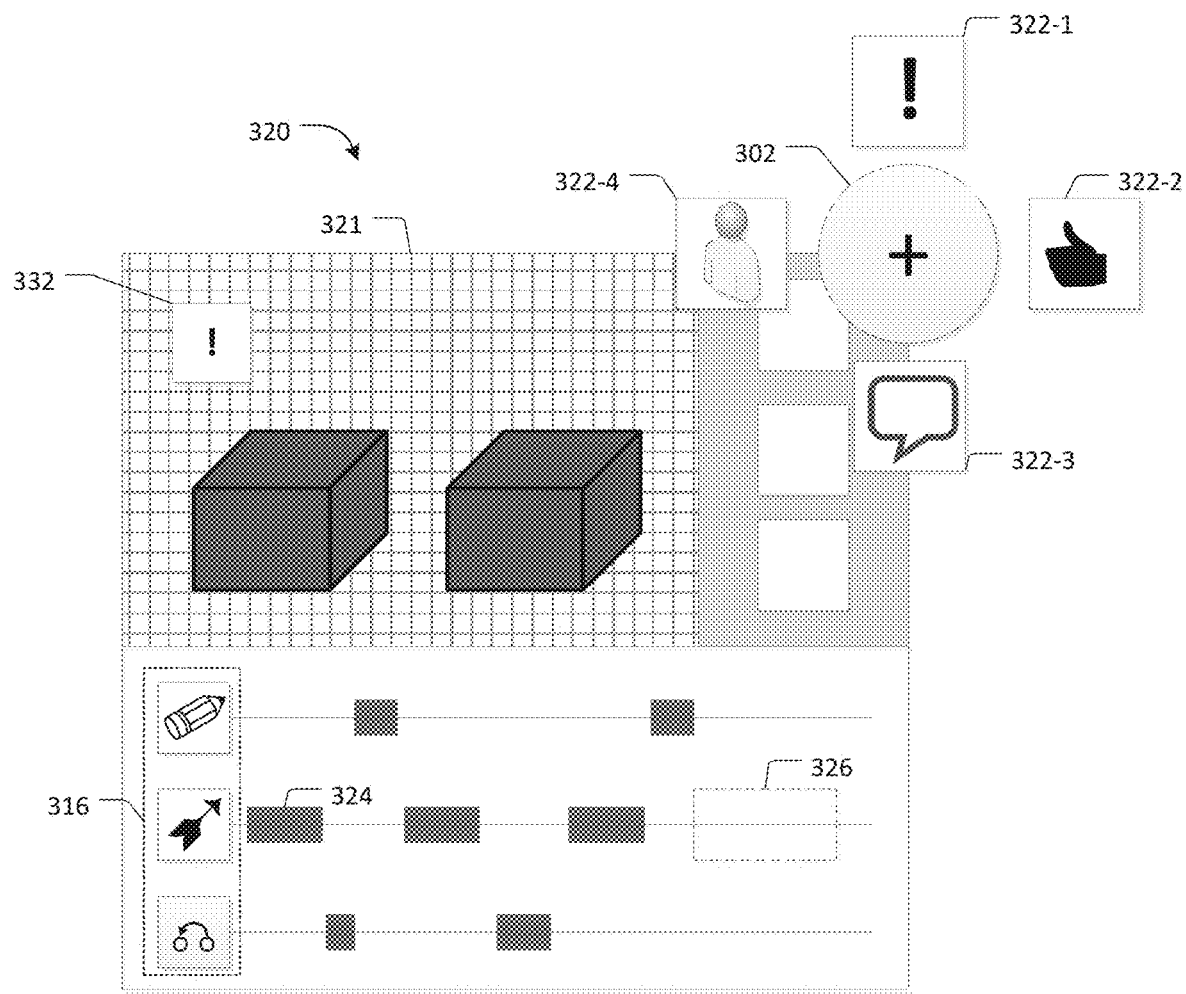
FIG. 3B illustrates an example graphical user interface for a student context included in the facilitator application, according to various embodiments of the present invention.
Figure 3C:
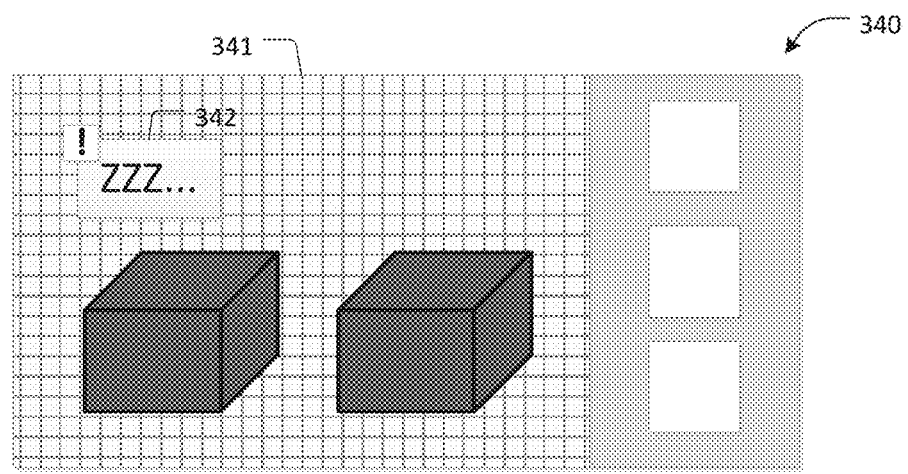
FIG. 3C illustrates an example graphical user interface for a student application, according the various embodiments of the present invention.

FIGS. 3A-3C illustrate examples of the graphical user interface 210 of FIG. 2, according to various embodiments of the present invention. FIG. 3A illustrates an example graphical user interface 300 for the facilitator application, according to various embodiments of the present invention. As shown, user interface 300 depicts one or more student contexts 310 (e.g., 310-1 to 310-6).

Each student context 310 includes a remediation window 302, an application view 304 corresponding to application instance 132-1, and/or an action timeline 306. In operation, orchestration engine can analyze student data associated with each respective student context against a target action and determine whether the student actions associated with a student context successfully performed a target action. Orchestration engine 224 can then cause the student context 310 to include a progress indication 308, 310, 312 that indicates the determination of whether a student user successfully performed the student action.

For example, user interface 300 includes six student contexts 310-1 to 310-6 that each indicate the relative progress of respective students in performing a given target action. In some embodiments, the target action is specified by the leader by performing a facilitator action in application engine 114. In such instances, orchestration engine 224 can compare the received student data 134 to the facilitator action to determine whether the actions match. In some embodiments, orchestration engine 224 can use heuristic techniques to determine whether the student actions correspond to the target action. For example, orchestration engine 224 can use heuristic techniques to determine that the student action does not exactly match the target action, but are within a defined tolerance that deems the student action similar to the target action. In such instances, orchestration engine 224 can determine that the student action corresponds to the target action.

Upon comparing the student data 134 for each respective student, orchestration engine 224 can provide a determination of whether the received student actions correspond to the target action. For example, orchestration engine 224 could determine that the student data 134 corresponding to student contexts 310-2, 310-3, and 310-4 performed the target action successfully. Orchestration engine 224 could then cause user interface 300 to display a success indication 310 for these contexts. Similarly, orchestration engine 224 could determine that the student data 134 corresponding to student contexts 310-5 and 310-6 performed the target action unsuccessfully. Orchestration engine 224 could then cause user interface 300 to display a fail indication 312 for these contexts. In addition, orchestration engine 224 could determine that the student data 134 corresponding to student contexts 310-1 has not yet performed the target action successfully. Orchestration engine 224 could then cause user interface 300 to display a waiting indication 308 for this context.

FIG. 3B illustrates an example graphical user interface 320 for a student context 321 included in facilitator application 112, according to various embodiments of the present invention. Student context 321 includes individual activity timelines 316, activities 324, idle periods 326, and notification window 332. Remediation window 302 includes one or more associated candidate remediation actions 322 (e.g., 322-1 to 322-4). In operation, orchestration engine 224 analyzes student data 134 to determine one or more periods associated with each activity 324, as separated by activity group. Orchestration engine can analyze specific student actions or specific groups of student actions within a specified time period in order to determine whether the student action indicates that the student did not perform the a task correctly, and if not, the specific issue associated with the student action.

For example, orchestration engine 224 could analyze student data 134-1 for a defined time period and compare the actions performed within the time period with a target action. Orchestration engine 224 could determine that, based on the student user not performing any navigational actions, the user is idle. Orchestration engine 224 could then cause user interface 320 to display the idle period 326 within the activity timelines 316 to indicate that the user did not perform any navigational actions for a threshold period.

In some embodiments, orchestration engine 224 can cause one or more cause user interface 320 to display one or more candidate remediation actions 322 associated with the issue indicator. For example, orchestration engine 224 could determine that the student data 134-1 corresponds to an issue indicator of an idle period. Orchestration engine 224 could then cause student context 321 to display remediation window 302 with four candidate remediation actions 322. The candidate remediation actions 322 are associated with one or more remedies for the issue identified with the student action.

For example, when orchestration engine 224 determines that the issue is that the student is idle, orchestration engine 224 could determine that the remedy for the issue is to remind the student to perform the target action. Orchestration engine 224 could then cause user interface 320 to display four candidate remediation actions 322 associated with the remedy. As shown, the candidate remediation actions include causing an alert notification to appear on within student application 132-1 (icon 322-1), highlighting a tool tip within student application 132-1 (icon 322-2), sending a text message to student application 132-1 (icon 322-3), and sending a notification to a student helper at student application 132-3 (icon 322-4). Orchestration engine 224 could wait for a selection from the leader before performing the specific remediation action. For example, orchestration engine 224 can determine that the leader selected the icon corresponding to causing an alert notification to appear on within student application 132-1. In such instances, orchestration engine 224 can cause one or more alerts to be displayed in student application 132-1 and/or student context 321. As shown, a notification alert 332 is displayed within student context 321.

FIG. 3C illustrates an example graphical user interface 340 for a student application 132, according the various embodiments of the present invention. As shown, the view of student application 132 corresponds to the application view 304 within the student context 310 provided by facilitator application 112. Student context 321 includes a view of graphical user interface 340 as displayed by student computer 130-1.

When orchestration engine 224 determines to specific remediation action in relation to student application 132-1, orchestration engine 224 can cause student application 132-1 perform an associated remediation action. For example, when the leader chooses an alert remediation action, orchestration engine 224 can cause alert notification 342 to appear on within a window 341 of student application 132-1.

Figure 4:
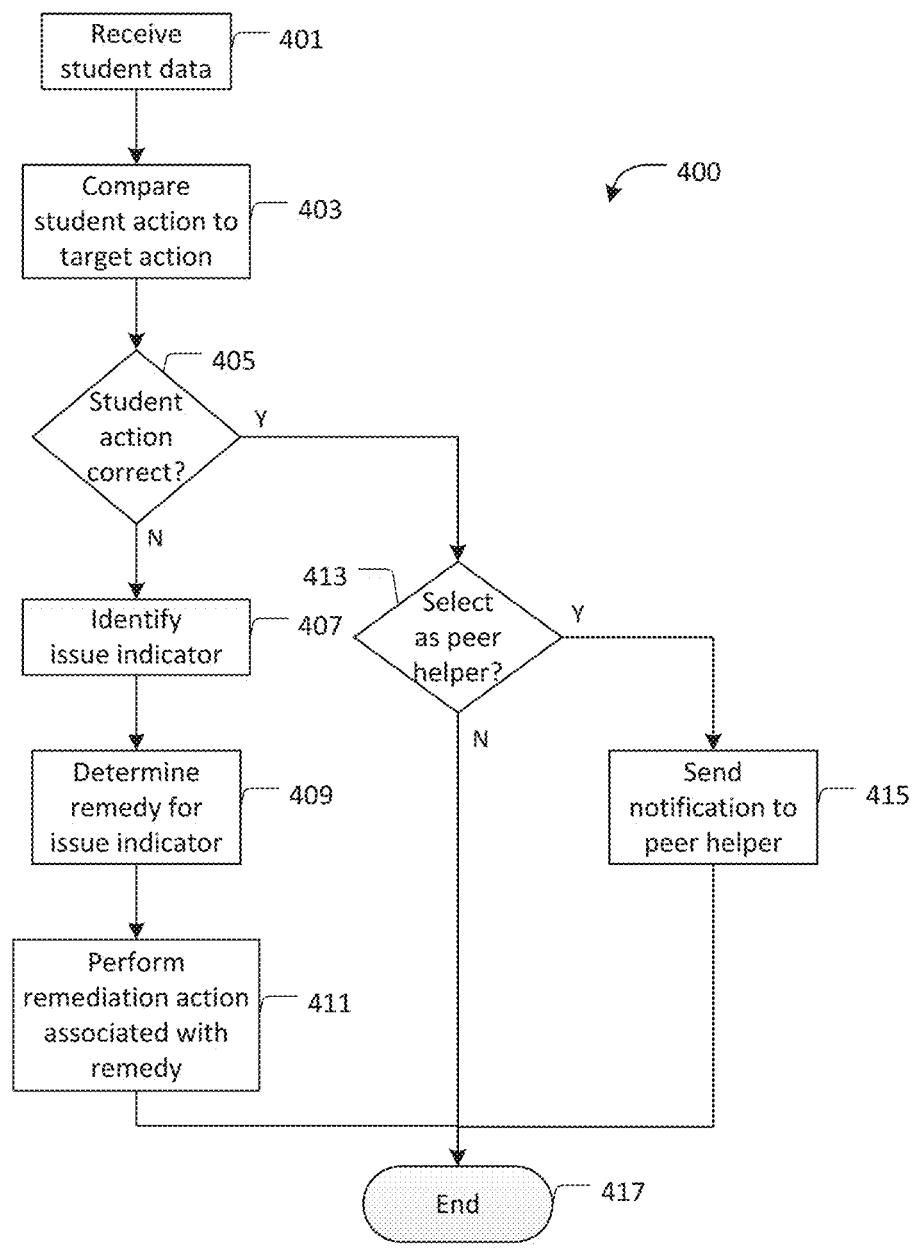
FIG. 4 is a flow diagram of method steps for performing a remediation action based on student data, according to various embodiments of the present invention.

FIG. 4 is a flow diagram of method steps for performing a remediation action based on student data, according to various embodiments of the present invention. Although the method steps are described with respect to the systems of FIGS. 1-2, 3A-3C, and 6, persons skilled in the art will understand that any system configured to perform the method steps, in any order, falls within the scope of the various embodiments.

As shown, method 400 begins at step 401, where a facilitator application 112 receives student data 134. An orchestration engine 224 included in facilitator application 112 can receive student data 134 from one or more student computers 130. In some embodiments, one or more student computers 130-1 to 130-3 can log data associated with one or more student actions performed within respective student application instances 132-1 to 132-3. The actions included in student data 134 can include one or more categories of logged actions executed within student application 132. For example, student data 134 can include a set of functional actions, a set of navigation actions, and/or a set of corrective actions.

At step 403, facilitator application 112 compares a student action to a target action. In some embodiments, the leader may generate a target action by performing a facilitator action within application engine 114. In some embodiments, application engine 114 may be an instance of an application corresponding to a student application instance 132-1. Orchestration engine 224 can extract at least one student action from student data 134 and compare the extracted student action to the target action. In some embodiments, orchestration engine 224 may extract student actions from each set of student data 134-1 to 134-3 and separately compare each of the extracted student actions to the same target action.

At step 405, facilitator application 112 determines, based on the comparison at step 403, whether the student action was performed correctly. In various embodiments, orchestration engine 224 can determine execute one or more heuristic techniques to determine whether the student action corresponds to the target action. In some embodiments, orchestration engine 224 can evaluate the student action by analyzing the student action and a corresponding activity pattern generated from data recording during one or more previous sessions. When orchestration engine 224 determines that the student action was performed correctly, facilitator application 112 proceeds to step 413, otherwise, orchestration engine proceeds to step 407.

For example, when the leader performs a task of rotating a three-dimensional model along three axes, orchestration engine 224 could record each rotation performed by the leader as a set of facilitator actions and mark the set of facilitator actions as the target action. Orchestration engine 224 could also receive from activity engine 226 an activity pattern relating to past student actions when attempting to perform the target action. Orchestration engine 224 could then compare the student actions included within student 134 for the applicable time period with the activity pattern to determine whether the student actions were performed correctly. For example, when orchestration engine 224 determines that the student actions were performed in a time period is longer than the time period specified by either the target actions or the activity pattern, orchestration engine 224 could determine that the set of student actions were not performed correctly.

At step 407, facilitator application 112 identifies an issue identifier associated with the student action. For example, orchestration engine 224 can respond to determining that the student did not perform the target action correctly by analyzing student data 134 to determine a specific issue that would require assistance. For example, upon determining that the student did not perform the target action of rotating a 3D model along the x-axis, orchestration engine 224 can analyze the functional action data, navigational action data, and/or correctional action data included in student data 134 to determine an issue identifier associated with the target action. In one example, orchestration engine 224 could analyze student data 134 and determine from the navigation data that the student was idle for an extended period; orchestration engine 224 can respond by applying an "idle" issue identifier. In another example, orchestration engine 224 could analyze student data 134 to determine that the student was performing actions using the zoom function instead of the rotate function; orchestration engine 224 could respond by applying a "wrong function" issue identifier.

At step 409, facilitator application 112 determines a remedy for the issue indicator identified at step 407. In various embodiments, orchestration engine 224 can select or identify a remedy that corresponds to the assigned issue identifier. In some embodiments, facilitator application 112 may retrieve one or more entries in a remedy LUT stored in database 240 that match a given issue identifier in order to select one or more applicable remedies. Additionally or alternatively, orchestration engine 224 can retrieve a plurality of candidate remedies associated with the issue identifier.

At step 411, facilitator application 112 performs a remediation action. In various embodiments, orchestration engine 224 can perform one or more remediation actions that are associated with the remedy corresponding to the issue identifier. For example, orchestration engine 224 could determine that the remedy for the issue indicator of an "idle" issue identifier is to provide remind the student to perform the target action. Orchestration engine 224 could perform a remediation action associated with providing the reminder to the student by initially sending a notification alert to facilitator computer 110. Alternatively, orchestration engine 224 could perform a different remediation action, such as causing student computer 130-2 to generate a text prompt. The text prompt notifies an identified peer helper at student computer 130-2 to send a text message to student computer 130-1.

In some embodiments, orchestration engine 224 can perform multiple remediation actions that are associated with the same remedy. For example, orchestration engine 224 can perform remediation action associated with a remedy of highlighting a function to execute. Such remediation actions can include, for example, causing student computer 130-1 to highlight a specified area of the display that includes a specific tool to use. Orchestration engine 224 can also perform a different mediation action by causing student computer 130-1 to display a pop-up notification whose contents describe how to use the highlighted tool. Upon performing the remediation action, orchestration engine 224 can end method 400 at step 417.

Returning to step 405, when facilitator application 112 determines that the student action was correctly performed, facilitator application 112 proceeds to step 413, where facilitator application 112 determines whether to select the student who performed the target action correctly as a peer helper. In some embodiments, orchestration engine 224 can track and/or log whether a student at student computer 130-2 performed one or more target actions correctly. In such instances, orchestration engine 224 can identify that student as a peer helper. The peer helper can provide additional assistance to one or more other students at student computers 130-1, 130-3 when the students are unable to successfully perform a target action that the peer helper successfully performed. When orchestration engine 224 determines to classify the student as a student helper, orchestration engine orchestration engine proceeds to step 415; otherwise orchestration engine 224 ends method 400 at step 417.

At step 415, facilitator application 112 sends a notification to the student at student computer 132-2 indicating that the student has been classified as a peer helper. In some embodiments, orchestration engine 224 can perform remediation actions associated with student computer 130-1 by causing student computer 132-2 to generate remediation actions. For example, orchestration engine 224 can cause student computer 132-2 to display an alert message to help a particular student (e.g., the user of student computer 130-1). In another example, orchestration engine 224 can initiate a chat box with another student, allowing the peer helper and the student to discuss the problem in more detail. Once orchestration engine 112 sends the notification to student computer 132-2, orchestration engine 112 ends method 400 at step 417.

Figure 5:
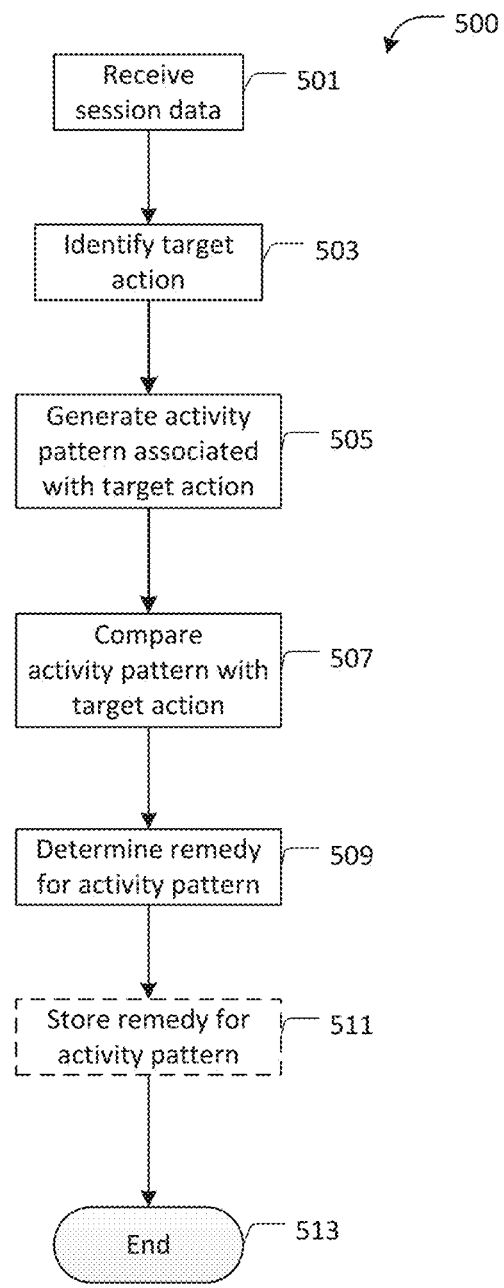
FIG. 5 is a flow diagram of method steps for analyzing session data for activity patterns, according to various embodiments of the present invention.

FIG. 5 is a flow diagram of method steps for analyzing session data for activity patterns, according to various embodiments of the present invention. Although the method steps are described with respect to the systems of FIGS. 1-2, 3A-3C, and 6, persons skilled in the art will understand that any system configured to perform the method steps, in any order, falls within the scope of the various embodiments.

As shown, method 500 begins at step 501, where facilitator application 112 receives session data. In various embodiments, activity engine 226 can receive student data 134 from one or more student computers 130-1 to 130-3 associated with a particular session of activity. The session data can be an aggregate of student data 134-1 to 134-3 produced for a portion of a workshop session. In some embodiments, activity engine 226 can receive additional session data from multiple previous sessions from database 240.

At step 503, facilitator application 112 identifies a target action. Activity engine 226 can identify one or more target actions that exemplify the action each student should take when performing a particular task. In some embodiments, activity engine 226 can retrieve the target action from a set of stored target actions in database 240. In some embodiments, activity engine 226 can apply heuristic algorithms on the session data in order to determine the most popular action taken and classify the most popular action as the target action.

At step 505, facilitator application 112 generates an activity pattern associated with the target action. Activity engine 226 analyzes the session data and determines a specific activity pattern performed by a plurality of students that is associated with a target action. For example, upon determining that the target action is to copy an object, activity engine 226 extract a subset of the session data to identify a set of student actions performed by a plurality of students when the students were tasked with performing the target action. Activity engine 226 can apply one or more heuristic algorithms to analyze the subset of session data to determine the most-likely actions students performed in relation to the target action.

At step 507, facilitator application 112 compares the activity pattern to the target action. Activity engine 226 compares the session data to the target action to determine whether an aggregate of students completed a target action successfully. When activity engine 226 determines that the aggregate of students did not complete a target action successfully, activity engine can then identify the applicable student issue associated with the activity pattern.

For example, activity engine 226 could compare a target action of copying an object with an activity pattern that indicates that the most-likely actions performed by the user were to either to perform a keyboard command to copy the object, or to navigate to the graphical representation of the copy object tool. In such instances, activity engine 226 can determine that a student is likely to perform the target action correctly. In another example, activity engine 226 can compare a target action of rotating an object along three axes to an activity pattern indicating that the most-likely actions performed by students were either performing the action of rotating the object along one axes, or performing no action. In such instances, activity engine 226 can determine that the student is not likely to perform the target action correctly and identify the applicable issue indicator.

At step 509, facilitator application 112 can determine a remedy for the activity pattern. In various embodiments, activity engine 226 can identify a remedy that corresponds to the one or more issue indicators identified by activity engine 226 when comparing the activity pattern to the target action. In some embodiments, activity engine 226 may retrieve one or more entries in a remedy LUT stored in database 240 that match a given issue indicator and/or target action in order to identify one or more applicable remedies.

At step 507, facilitator application 112 can optionally store the determined remedy. In various embodiments, activity engine 226 can store one or more entries that associate the one or more remedies determined in step 509 with the activity pattern. In some embodiments, the one or more entries can include a set of linked entries, where each entry is a separate association between one issue identifier and one associated remedy. Activity engine 226 can store the one or more entries in a database 240. For example, activity engine 226 could store three linked entries for a given activity pattern in a remedy lookup table in database 240.

Figure 6:
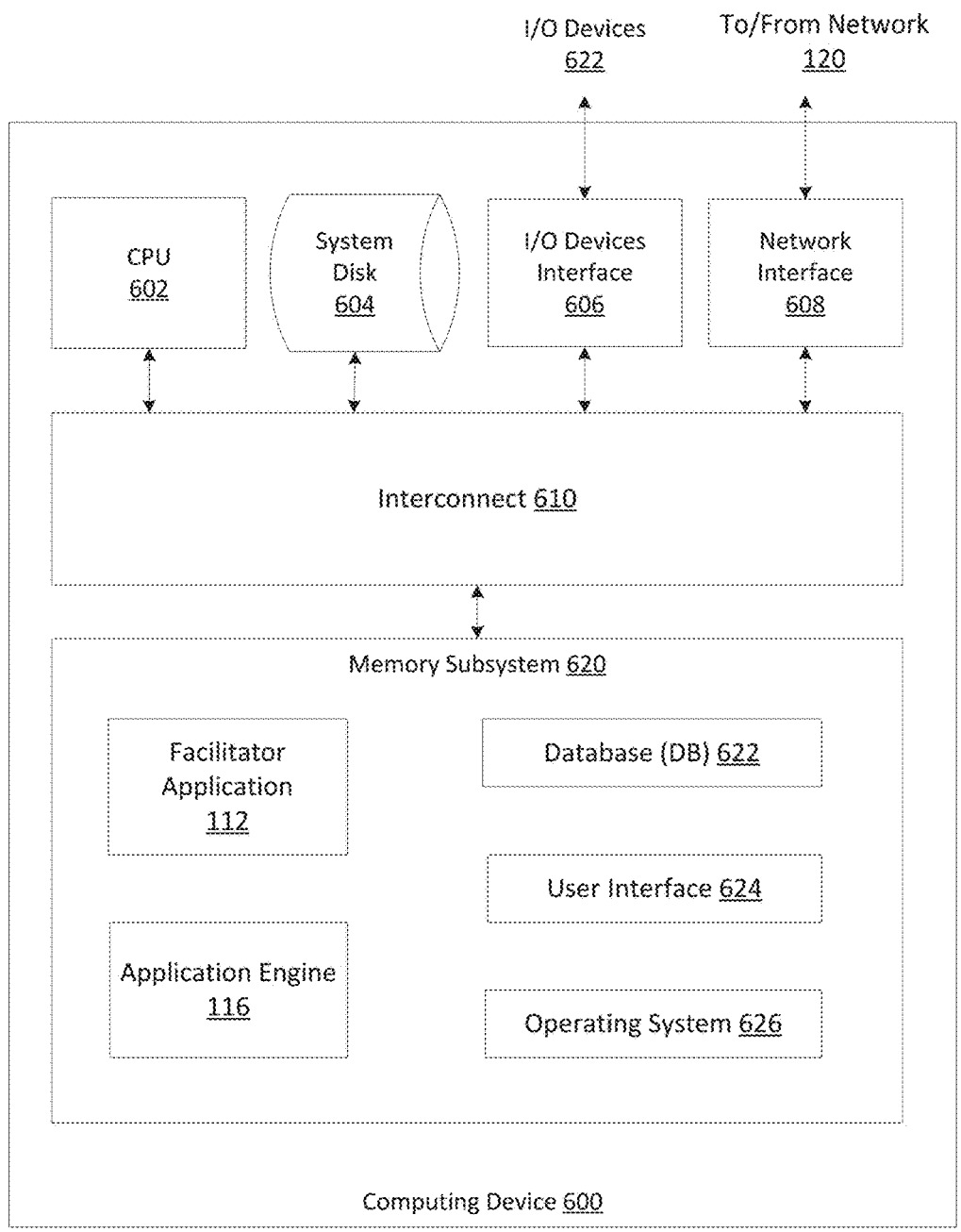
FIG. 6 is a more detailed illustration of a computing device included in the orchestration system of FIG. 1, according to one embodiment of the invention.

FIG. 6 is a more detailed illustration of a computing device included in the orchestration system 100 of FIG. 1, according to one embodiment of the invention. As shown, the computing device 600 includes a central processing unit (CPU) 602, a system disk 604, an input/output (I/O) devices interface 606, a network interface 608, an interconnect 610, and a memory subsystem 620. It will be appreciated that computing device 600 shown herein is illustrative, and that variations and modifications are possible. The number of CPUs 602, number of memory subsystems 620, and number of applications 112, 116 included in memory subsystem 620 may be modified, as desired. Further, the connection topology between the various units in computing device 600 may be modified, as desired. In some embodiments, any combination of CPU 602 and/or memory subsystem 620 may be replaced with any type of distributed computer system or cloud-computing environment, such as a public or a hybrid cloud.

CPU 602 is configured to retrieve and execute programming instructions stored in the memory subsystem 620. Similarly, CPU 602 is configured to store application data and retrieve application data from the memory subsystem 620. Interconnect 410 is configured to facilitate transmission of data, such as programming instructions and application data, between CPU 602, system disk 604, I/O devices interface 606, network interface 608, and the memory subsystem 620.

I/O devices interface 606 is configured to receive input data from I/O devices 622 and transmit the input data to CPU 602 via interconnect 410. For example, I/O devices 622 may comprise one or more buttons, a keyboard, and a mouse or other pointing device. I/O devices interface 606 is also configured to receive output data from CPU 602 via interconnect 410 and transmit the output data to I/O devices 622. System disk 604, such as a hard disk drive (HDD), a flash memory storage drive, or the like, is configured to store non-volatile data, such as logged user actions. Network interface 608 is coupled to the CPU 602 via interconnect 610 and is configured to transmit and receive packets of data via network 120. In one embodiment, network interface 608 is configured to operate in compliance with the well-known Ethernet standard.

The memory subsystem 620 stores content, such as software applications and data, for use by CPU 602. Memory subsystem 620 may be any type of memory capable of storing data and software applications, such as random-access memory (RAM), read-only memory (ROM), erasable programmable read-only memory (EPROM or Flash ROM), or any suitable combination of the foregoing. In some embodiments, storage (not shown) may supplement or replace system memory 210. The storage may include any number and type of external memories that are accessible to CPU 602. For example, and without limitation, the storage may include a Secure Digital Card, an external Flash memory, a portable compact disc read-only memory (CD-ROM), an optical storage device, a magnetic storage device, or any suitable combination of the foregoing.

In sum, a facilitator application receives real-time student data from one or more student computers. The real-time student data includes a logged set of actions performed by one or more students within a given time period. The set of actions correspond to actions taken within one or more student applications when the one or more students attempt to perform a specific target action. The facilitator application extracts one or more student actions from the student data and compares the actions with the target action. When the facilitator application determines, based on analyzing the student actions, that the target action was not performed correctly, the facilitator application assigns an issue to the student actions identifies a remedy associated with the assigned issue. The remedy potentially assists in successfully performing the target action. The facilitator application then performs one or more remediation actions associated with performing the remedy.

In some embodiments, the facilitator application compiles student data from one or more sessions of activity associated with a target action and generates an activity pattern associated with the target action. The facilitator application compares the activity pattern to the target action and generates identifies issues associated with the activity pattern. In some embodiments, the facilitator application determines one or more remedies to associate with the activity pattern. In such instances, the facilitator application generates associates the remedy with the activity pattern and stores the association for use by the facilitator application when managing real-time student data.

At least one technological advantage of the described techniques is that the orchestration system automatically identifies an issue experienced by a student when attempting to perform a specified task. The orchestration system responds by performing one or more remediation actions associated with a remedy for the issue, including sending alerts to the student needing assistance. Additionally or alternatively, the remediation action includes prompting the instructor to perform a recommended remediation action. The orchestration system thus automatically identifies issues and associated remedies, effectively assisting students when perform a specific task. The orchestration system thus increases the usability of tools and functions included in a software product, and enables a leader to more effectively manage a group of users through performing a specific task.

1. In some embodiments, a computer-implemented method for remotely monitoring performance of a task in real time comprises receiving, in real time from a first student computing device, first student data that includes a first set of actions performed in a first student application instance executing on the first student device, comparing a first student action included in the first set of actions to a first target action, in response to comparing the first student action to the first target action, identifying a first issue indicator associated with the first student action, determining a first remedy associated with at least one of the first target action and the first issue indicator, and performing a first remediation action associated with the first remedy.

2. The computer-implemented method of clause 1, where performing the first remediation action comprises causing the first student computing device to execute the first remediation action associated with the first remedy.

3. The computer-implemented method of clause 1 or 2, where performing the first remediation action comprises causing a facilitator computing device to display a first notification associated with the first remedy, the method further comprising receiving, by the facilitator computing device, a first remediation response associated with the first notification, and causing the first student computing device to execute a second remediation action associated with the first remedy.

4. The computer-implemented method of any of clauses 1-3, further comprising receiving, from a second student computing device, second student data that includes a second set of actions performed in a second student application instance executing on the second student device.

5. The computer-implemented method of any of clauses 1-4, further comprising aggregating the first student data and the second student data to generate first session data.

6. The computer-implemented method of any of clauses 1-5, further comprising comparing a second student action included in the second set of actions to the first target action, in response to comparing the first action to the first target action, classifying a user associated with the second student computing device as a candidate peer helper.

7. The computer-implemented method of any of clauses 1-6, where the performing the first remediation action comprises causing the second student computing device to display a first notification action associated with the first student computing device.

8. The computer-implemented method of any of clauses 1-7, further comprising receiving a first facilitator action performed in a facilitator application instance implemented by a facilitator computing device, and storing the first facilitator action as the first target action.

9. The computer-implemented method of any of clauses 1-8, further comprising receiving, by a facilitator computing device, first session data, where the first session data includes a plurality of student data, extracting, from the first session data, a first subset of actions performed in one or more student application instances, where the first subset of actions are associated with the first target action, and generating a first activity pattern based on the first subset of actions.

10. The computer-implemented method of any of clauses 1-9, where comparing the first student action to the first target action comprises comparing the first student action to the first activity pattern.

11. In some embodiments, one or more non-transitory computer-readable media storing instructions that, when executed by one or more processors, cause the one or more processors to perform the steps of receiving, in real time from a first student computing device, first student data that includes a first set of actions performed in a first student application instance executing on the first student device, comparing a first student action included in the first set of actions to a first target action, in response to comparing the first student action to the first target action, identifying a first issue indicator associated with the first target action, determining a first remedy associated with at least one of the first target action and the first issue indicator, and performing a first remediation action associated with the first remedy.

12. The one or more non-transitory computer-readable media of clause 11, further comprising instructions that, when executed by the one or more processors, cause the one or more processors to perform the step of causing a facilitator computing device to render for display a first context based at least on the first student data, where the first context includes a first graphical view that includes a set of one or more remediation actions associated with the first remedy.

13. The one or more non-transitory computer-readable media of clause 11 or 12, where the first context further comprises a first second graphical view, the second graphical view displaying one or more graphs based on at least of at least one of a first subset of actions included in the first set of actions, where the first subset of actions are associated with interaction functions performed in the first student application instance, a second subset of actions included in the first set of actions, where the second subset of actions are associated with navigation actions performed in the first student application instance, and a third subset of actions included in the first set of actions, where the third subset of actions, are associated with correction functions performed in the first student application instance.

14. The one or more non-transitory computer-readable media of any of clauses 11-13, further comprising instructions that, when executed by the one or more processors, cause the one or more processors to perform the step of receiving, in real time from a second student computing device, second student data that includes a second set of actions performed in a second student application instance executing on the second student device.

15. The one or more non-transitory computer-readable media of any of clauses 11-14, further comprising instructions that, when executed by the one or more processors, cause the one or more processors to perform the step of aggregating the first student data and the second student data to generate first session data.

16. The one or more non-transitory computer-readable media of any of clauses 11-14, further comprising instructions that, when executed by the one or more processors, cause the one or more processors to perform the step of causing a facilitator computing device to render for display a first context based at least on the first student data, and a second context based at least on the second student data, where at least one of the first context and the second context includes a first graphical view that includes a set of one or more remediation actions associated with the first remedy.

17. The one or more non-transitory computer-readable media of any of clauses 11-16, further comprising instructions that, when executed by the one or more processors, cause the one or more processors to perform the steps of comparing a second student action included in the second set of actions to the first target action, in response to comparing the second student action to the first target action, classifying a user associated with the second student computing device as a candidate peer helper, and causing the second student computing device to render for display a first notification action associated with the first student computing device.

18. In some embodiments, a computing system for remotely monitoring performance of a task in real time comprises a memory storing a facilitator application, and a processor coupled to the memory that executes the facilitator application by performing the steps of receiving, in real time from a first student computing device, first student data that includes a first set of actions performed in a first student application instance executing on the first student device, comparing a first student action included in the first set of actions to a first target action, in response to comparing the first student action to the first target action, identifying a first issue indicator associated with the first student action, determining a first remedy associated with at least one of the first target action and the first issue indicator, and performing a first remediation action associated with the first predetermined remedy.

19. The computer system of clause 18, where the processor further executes the facilitator application by performing the steps of receiving, in real time from a second computing device, second student data that includes a second set of actions performed in a second student application instance executing on the second computing device, and comparing a second student action included in the second set of actions to the first target action.

20. The computer system of clause 18 or 19, where the processor further executes the facilitator application by performing the step of causing the first student computing device to display a first notification associated with the first remedy.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for remotely monitoring real-time performance of tasks in a computer application, the method comprising:
   receiving, by a facilitator computing device in real time from a first student computing device, first student data that specifies at least one application tool comprising at least one of a function tool or a navigation tool used to perform a first set of actions, wherein the at least one application tool is implemented in a first student application instance of the computer application executing on the first student computing device;
   comparing, based on an analysis of the first student data, a first student action included in the first set of actions to a first target action performed in a first set of target actions to
   identify a first issue indicator associated with the first student action, the first issue indicator being identified from a plurality of issue indicators that respectively indicate a difference between the first student action and the first target action, wherein the first issue indicator indicates that the first student action was performed via a first application tool and the first target action is performed via a second application tool that is different from the first application tool;
   determining, by the facilitator computing device and based on a first mapping stored in a database, a first remedy associated with the first issue indicator; and
   performing a first remediation action associated with the first remedy.

2. The computer-implemented method of claim 1, wherein performing the first remediation action comprises causing the first student computing device to execute the first remediation action associated with the first remedy.

3. The computer-implemented method of claim 1 wherein:
   performing the first remediation action comprises displaying, by the facilitator computing device, a first notification associated with the first remedy,
   the method further comprises:
      receiving, by the facilitator computing device, a first remediation response associated with the first notification; and
      causing the first student computing device to execute a second remediation action associated with the first remedy.

4. The computer-implemented method of claim 1, further comprising receiving, from a second student computing device, second student data that includes a second set of actions performed in a second student application instance executing on the second student computing device.

5. The computer-implemented method of claim 4, further comprising aggregating the first student data and the second student data to generate first session data.

6. The computer-implemented method of claim 4, further comprising:
    comparing a second student action included in the second set of actions to the first target action;
    in response to comparing the first student action to the first target action, classifying a user associated with the second student computing device as a candidate peer helper.

7. The computer-implemented method of claim 6, wherein the performing the first remediation action comprises causing the second student computing device to display a first notification action associated with the first student computing device.

8. The computer-implemented method of claim 1, further comprising:
    receiving a first facilitator action performed in a facilitator application instance implemented by the facilitator computing device; and
    storing the first facilitator action as the first target action.

9. The computer-implemented method of claim 1, further comprising:
    receiving, by the facilitator computing device, first session data, wherein the first session data includes a plurality of student data generated by a plurality of student computing devices;
    extracting, from the first session data, a first subset of actions performed in one or more student application instances, wherein the first subset of actions is associated with the first target action; and
    generating a first activity pattern based on the first subset of actions,
    wherein the first issue indicator is identified from the plurality of issue indicators based on the first activity pattern.

10. The computer-implemented method of claim 9, wherein comparing the first student action to the first target action comprises comparing the first student action to the first activity pattern.

11. One or more non-transitory computer-readable media storing instructions that, when executed by one or more processors, cause the one or more processors to remotely monitor real-time performance of a computer application by performing the steps of:
    receiving, by a facilitator computing device in real time from a first student computing device, first student data that specifies at least one application tool comprising at least one of a function tool or a navigation tool used to perform a first set of actions, wherein the at least one application tool is implemented in a first student application instance of the computer application executing on the first student computing device;
    comparing, based on an analysis of the first student data, a first student action included in the first set of actions to a first target action performed in a first set of target actions to
    identify a first issue indicator associated with the first student action, the first issue indicator being identified from a plurality of issue indicators that respectively indicate a difference between the first student action and the first target action, wherein the first issue indicator indicates that the first student action was performed via a first application tool and the first target action is performed via a second application tool that is different from the first application tool;
    determining, by the facilitator computing device and based on a first mapping stored in a database, a first remedy associated with the first issue indicator; and
    performing a first remediation action associated with the first remedy.

12. The one or more non-transitory computer-readable media of claim 11, further comprising instructions that, when executed by the one or more processors, cause the one or more processors to perform the step of:
    rendering for display, by the facilitator computing device, a first context based at least on the first student data,
    wherein the first context includes a first graphical view that includes, based on the first mapping, a set of one or more remediation actions associated with the first remedy.

13. The one or more non-transitory computer-readable media of claim 12, wherein the first context further comprises a second graphical view displaying one or more graphs based on at least of at least one of:
    a first subset of actions included in the first set of actions, wherein the first subset of actions is associated with interaction functions performed in the first student application instance;
    a second subset of actions included in the first set of actions, wherein the second subset of actions is associated with navigation actions performed in the first student application instance; or
    a third subset of actions included in the first set of actions, wherein the third subset of actions, is associated with correction functions performed in the first student application instance.

14. The one or more non-transitory computer-readable media of claim 11, further comprising instructions that, when executed by the one or more processors, cause the one or more processors to perform the step of receiving, in real time from a second student computing device, second student data that includes a second set of actions performed in a second student application instance executing on the second student computing device.

15. The one or more non-transitory computer-readable media of claim 14, further comprising instructions that, when executed by the one or more processors, cause the one or more processors to perform the step of aggregating the first student data and the second student data to generate first session data.

16. The one or more non-transitory computer-readable media of claim 14, further comprising instructions that, when executed by the one or more processors, cause the one or more processors to perform the step of rendering for display, by the facilitator computing device:
    a first context based at least on the first student data; and
    a second context based at least on the second student data,
    wherein at least one of the first context and the second context includes a first graphical view that includes a set of one or more remediation actions associated with the first remedy.

17. The one or more non-transitory computer-readable media of claim 14, further comprising instructions that, when executed by the one or more processors, cause the one or more processors to perform the steps of:
    comparing a second student action included in the second set of actions to the first target action;
    in response to comparing the second student action to the first target action, classifying a user associated with the second student computing device as a candidate peer helper; and
    causing the second student computing device to render for display a first notification action associated with the first student computing device.

18. A computing system for remotely monitoring real-time performance of tasks in a computer application, the computing system comprising:
- a memory storing a facilitator application, and
- a processor coupled to the memory that executes the facilitator application by performing the steps of:
  - receiving, by a facilitator computing device in real time from a first student computing device, first student data that specifies at least one application tool comprising at least one of a function tool or a navigation tool used to perform a first set of actions, wherein the at least one application tool is implemented in a first student application instance of the computer application executing on the first student computing device;
  - comparing, based on an analysis of the first student data, a first student action included in the first set of actions to a first target action performed in a first set of target actions to
  - identify a first issue indicator associated with the first student action, the first issue indicator being identified from a plurality of issue indicators that respectively indicate a difference between the first student action and the first target action, wherein the first issue indicator indicates that the first student action was performed via a first application tool and the first target action is performed via a second application tool that is different from the first application tool;
  - determining, by the facilitator computing device and based on a first mapping stored in a database, a first predetermined remedy associated with the first issue indicator; and
  - performing a first remediation action associated with the first predetermined remedy.

19. The computer system of claim 18, wherein the processor further executes the facilitator application by performing the steps of:
- receiving, in real time from a second computing device, second student data that includes a second set of actions performed in a second student application instance executing on the second computing device; and
- comparing a second student action included in the second set of actions to the first target action.

20. The computer system of claim 18, wherein the processor further executes the facilitator application by performing the step of causing the first student computing device to display a first notification associated with the first predetermined remedy.

* * * * *